(12) United States Patent
Kimoto et al.

(10) Patent No.: US 11,016,065 B2
(45) Date of Patent: May 25, 2021

(54) GAS CHROMATOGRAPH

(71) Applicant: Shimadzu Corporation, Kyoto (JP)

(72) Inventors: Yasuhiro Kimoto, Kyoto (JP); Shingo Masuda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 194 days.

(21) Appl. No.: 16/335,166

(22) PCT Filed: Oct. 11, 2016

(86) PCT No.: PCT/JP2016/080106
§ 371 (c)(1),
(2) Date: Mar. 20, 2019

(87) PCT Pub. No.: WO2018/069959
PCT Pub. Date: Apr. 19, 2018

(65) Prior Publication Data
US 2019/0277814 A1 Sep. 12, 2019

(51) Int. Cl.
*G01N 30/40* (2006.01)
*G01N 30/32* (2006.01)
(Continued)

(52) U.S. Cl.
CPC ............ *G01N 30/40* (2013.01); *G01N 30/12* (2013.01); *G01N 30/26* (2013.01); *G01N 30/32* (2013.01);
(Continued)

(58) Field of Classification Search
CPC ............ G01N 30/00–02; G01N 30/12; G01N 30/26–40; G01N 30/64; G01N 30/86; G01N 30/8675; G01N 2030/025
See application file for complete search history.

(56) References Cited

U.S. PATENT DOCUMENTS

| 5,933,357 A | * | 8/1999 | Tipler | G01N 30/40 |
| | | | | 700/273 |
| 8,656,754 B2 | * | 2/2014 | Kawana | G01N 30/28 |
| | | | | 73/23.42 |
| 10,024,829 B2 | * | 7/2018 | Tipler | G01N 30/66 |

FOREIGN PATENT DOCUMENTS

| JP | 2005274416 A | * | 10/2005 | G01N 30/78 |
| JP | 2011017606 A | * | 1/2011 | G01N 30/20 |

(Continued)

OTHER PUBLICATIONS

Written Opinion by the International Search Authority dated Jan. 10, 2017 for PCT application PCT/JP2016/080106, submitted with a machine translation.

*Primary Examiner* — Nguyen Q. Ha
(74) *Attorney, Agent, or Firm* — Muir Patent Law, PLLC

(57) ABSTRACT

In a gas chromatograph 1, a back-pressure calculation processor 242 calculates a back pressure for a first detector. The pressure calculation processor 243 calculates a pressure of a carrier gas in a branching part. The back-flow determination processor 244 compares the pressure of the carrier gas in the branching part calculated by the pressure calculation processor 243 with the back pressure of the first detector calculated by the back-pressure calculation processor 242, and if the pressure of the carrier gas in the branching part is smaller than the back pressure of the first detector, the back-flow determination processor 244 determines that the carrier gas will flow back. It is therefore possible to surely know that there is a possibility that a back-flow of the carrier gas will occur, by checking the determination result of the back-flow determination processor 244.

3 Claims, 3 Drawing Sheets

(51) Int. Cl.
    *G01N 30/86*     (2006.01)
    *G01N 30/12*     (2006.01)
    *G01N 30/64*     (2006.01)
    *G01N 30/26*     (2006.01)
    *G01N 30/02*     (2006.01)

(52) U.S. Cl.
    CPC ............ *G01N 30/64* (2013.01); *G01N 30/86* (2013.01); *G01N 30/8675* (2013.01); *G01N 2030/025* (2013.01)

(56) References Cited

FOREIGN PATENT DOCUMENTS

| | | | |
|---|---|---|---|
| JP | 5594989 B | 8/2014 | |
| WO | WO-2020049614 A1 * | 3/2020 | ............. G01N 30/32 |

\* cited by examiner

GAS CHROMATOGRAPH

TECHNICAL FIELD

The present invention relates to a gas chromatograph which includes a branching part which causes a carrier gas having passed through a column to branch, and a plurality of detectors connected to the branching part.

BACKGROUND ART

In the gas chromatograph, a carrier gas and a sample gas are supplied into a column from a sample injector, a sample component is separated in a course of the carrier gas passing through the column, and the separated sample component is detected by a detector. As the gas chromatograph described above, a gas chromatograph is known in which a branching part is provided on a downstream side of a column (on a downstream side in an inflow direction of a gas) and a plurality of detectors are connected to the branching part (for example, see Patent Document 1 below).

Examples of the plurality of detectors provided in the gas chromatograph include a flame ionization detector (FID), a flame thermionic detector (FTD), and a flame photometric detector (FPD), and various types of detectors can be used. With this arrangement, each detector can detect a sample component on the basis of characteristics of the detector, and various analyses of the sample component can be therefore performed.

PRIOR ART DOCUMENT

Patent Document

Patent Document 1: Japanese Patent No. 5594989

SUMMARY OF THE INVENTION

Problems to be Solved by the Invention

In the above-described conventional gas chromatograph, in some cases, a gas does not flow appropriately in each detector, thereby disabling accurate detection. Specifically, in the above-described conventional gas chromatograph, a detector is sometimes used in which a back pressure is applied like in the case of a dielectric barrier discharge ionization detector (BID) and the like. In this case, when the back pressure of the detector is higher than the pressure of the gas flowing into the branching part, the gas flows back to the branching part from the detector. Then the gas flowing back flows into other detectors in some cases.

To prevent such a back-flow of the gas, it is considered that a pressure controller is connected to the branching part and a pressure is applied to the branching part. However, if the gas chromatograph is configured to include a pressure controller, it increases the cost.

The present invention has been made in view of the above issue, and an object of the present invention is to provide a gas chromatograph in which a carrier gas can be made to flow in each of the detectors without providing a pressure controller.

Means for Solving the Problems (1) A gas chromatograph according to the present invention includes a column, a branching part, a plurality of detectors, a pressure calculation processor, and a back-flow determination processor. Into the column, a carrier gas is introduced from a sample injector together with a sample. The branching part causes the carrier gas having passed through the column to branch to a plurality of ports. The plurality of detectors include at least one detector to which a back pressure is applied. The detectors are each connected to each of the plurality of ports through a resistance pipe and detect components in the sample separated in the column. The pressure calculation processor calculates a pressure of the carrier gas in the branching part. The back-flow determination processor determines whether the carrier gas will flow back to the branching part side from the at least one detector, by comparing the pressure calculated by the pressure calculation processor with a back pressure of the at least one detector.

The carrier gas introduced into the column is made to branch in the branching part and is introduced into each detector. The plurality of detectors include at least one detector to which a back pressure is applied. Thus, if the back pressure of the detector is higher than the pressure of the carrier gas introduced in the branching part, the carrier gas flows back from the detector toward the branching part in some cases.

According to the above-described configuration, the pressure calculation processor calculates the pressure of the carrier gas in the branching part, and the back-flow determination processor determines whether the carrier gas will flow back, by comparing the pressure calculated by the pressure calculation processor with the back pressure of the detector.

It is thus possible to surely know that there is a possibility that a back-flow of the carrier gas will occur, by checking a determination result of the back-flow determination processor.

As a result, if there is a possibility that a back-flow of the carrier gas will occur, it is possible to cause the carrier gas to appropriately flow in each of the detectors by, for example, changing the pressure of the sample injector or changing the column or the resistance pipe so that the determination result of the back-flow determination processor becomes to indicate that no back-flow of the carrier gas will occur.

That is, with the gas chromatograph of the present invention, it is possible to causes a carrier gas to flow appropriately in each of a plurality of detectors without providing a pressure controller.

(2) In addition, the gas chromatograph may further include a notification processor. When the back-flow determination processor has determined that the carrier gas will flow back from the at least one detector to the branching part side, the notification processor notifies that a back-flow will occur.

With such a configuration, notification of a notification processor enables a user to surely recognize that there is a possibility that the carrier gas will flow back.

(3) Further, the pressure calculation processor may calculate the pressure of the carrier gas in the branching part on the basis of a pressure in the sample injector, pressures in the plurality of detectors, inner diameters of the column and the resistance pipes, and lengths of the column and the resistance pipes.

Such a configuration enables the pressure calculation processor to accurately calculate the pressure of the carrier gas in the branching part.

Effects of the Invention

With the present invention, if there is a possibility that a back-flow of the carrier gas will occur, it is possible to surely know that by checking the determination result of the back-flow determination processor. As a result, if there is a possibility that a back-flow of the carrier gas will occur, it is possible to cause the carrier gas to appropriately flow into each of the detectors by, for example, changing the pressure of the sample injector or changing the resistance pipe so that the determination result of the back-flow determination processor becomes to indicate that no back-flow of the carrier gas will occur.

MODE FOR CARRYING OUT THE INVENTION

1. Overall Structure of Gas Chromatograph

Figure 1:
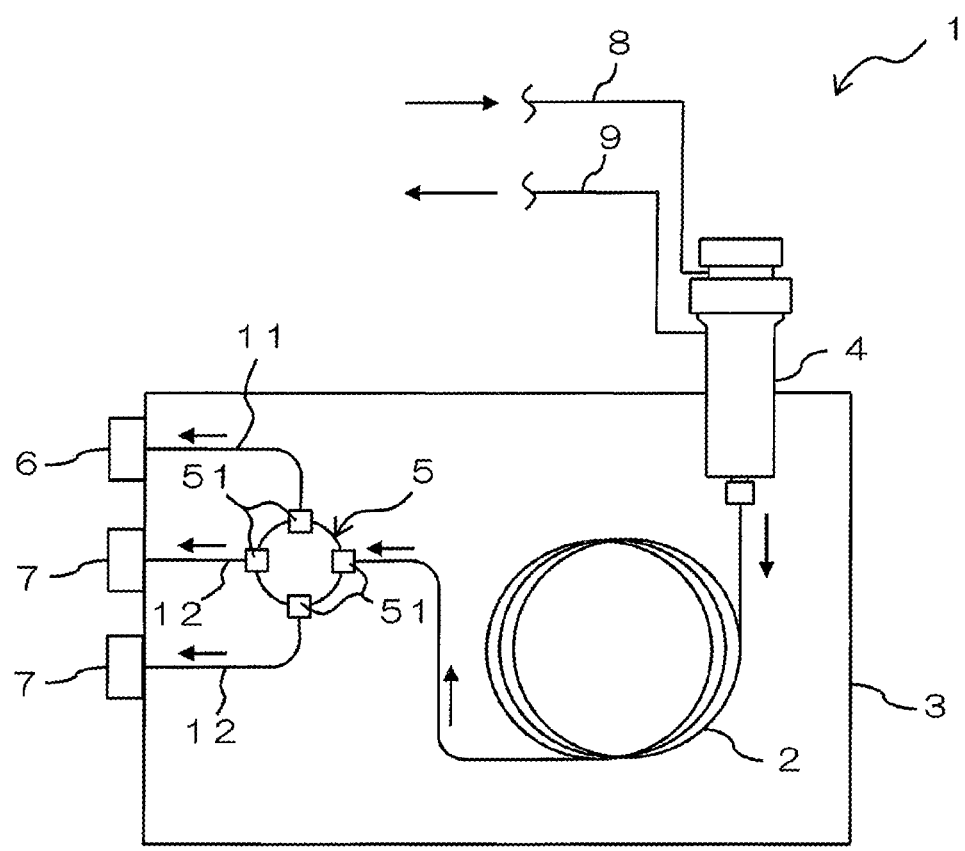
FIG. 1 is a schematic diagram showing a configuration example of a gas chromatograph according to an embodiment of the present invention.

FIG. 1 is a schematic diagram showing a configuration example of a gas chromatograph 1 according to an embodiment of the present invention. The gas chromatograph 1 is for analyzing a sample gas by supplying the sample gas together with a carrier gas into a column 2 and includes, other than the above column 2, a column oven 3, a sample injector 4, a branching part 5, a first detector 6, second detectors 7, and the like.

The column 2 is constituted by, for example, a capillary column. The column 2 is housed in the column oven 3 together with a heater, a fan, and the like (none of them shown in the drawings).

The column oven 3 is for heating the column 2, and the heater and the fan are appropriately driven at the time of analysis.

The sample injector 4 is for introducing the carrier gas and the sample gas into the column 2, and a sample vaporization chamber (not shown) is formed in the sample injector 4, for example. A liquid sample is injected into the sample vaporization chamber, and the sample vaporized in the sample vaporization chamber is introduced into the column 2 together with the carrier gas. Further, a gas supply flow path 8 and a split flow path 9 are in communication with the sample vaporization chamber.

The gas supply flow path 8 is a flow path for supplying the carrier gas into the sample vaporization chamber of the sample injector 4.

The split flow path 9 is a flow path for discharging outside a part of a gas (a mixed gas of the carrier gas and the sample gas) in the sample vaporization chamber at a predetermined split ratio when the carrier gas and the sample gas are introduced into the column 2 by a split injection method.

Into the branching part 5, the carrier gas (the mixed gas of the carrier gas and the sample gas) having passed through the column 2 is introduced. The branching part 5 includes a plurality of (four) ports 51, and the carrier gas having passed through the column 2 is introduced into one of the ports 51. At the branching part 5, the plurality of (four) ports 51 are in communication with each other. On the branching part 5, there is provided no pressure controller, and the gas introduced into one of the ports 51 is made to branch and is led to the other ports 51.

The first detector 6 is a detector to which a back pressure is applied, and is a dielectric barrier discharge ionization detector (BID), for example. The first detector 6 is connected to the port 51 of the branching part 5 through a first introduction pipe 11.

The second detector 7 is a detector which is open to the atmosphere, and is, for example, a flame ionization detector (FID), a flame thermionic detector (FTD), or a flame photometric detector (FPD). In this example, the gas chromatograph 1 includes two second detectors 7. The second detectors 7 are connected to the ports 51 of the branching part 5 through second introduction pipes 12. Note that the second introduction pipes 12 and the first introduction pipe 11 are an example of a resistance pipe.

When a sample is measured with the gas chromatograph 1, the sample to be an analysis object is injected into the sample injector 4. The sample is vaporized in the sample vaporization chamber. In addition, a carrier gas is supplied into the sample vaporization chamber of the sample injector 4 through the gas supply flow path 8.

The sample vaporized in the sample vaporization chamber is introduced into the column 2 together with the carrier gas. Sample components contained in the sample are separated when passing through the column 2 and are introduced into the port 51 of the branching part 5 together with the carrier gas. Then, the carrier gas (the carrier gas containing the sample components) is caused to branch to the ports 51 other than the port 51 into which the carrier gas is introduced, and the carrier gas is introduced into the first detector 6 through the first introduction pipe 11 and is simultaneously introduced into the second detectors 7 through the second introduction pipes 12. In this way, the carrier gas having passed through the columns 2 is simultaneously introduced into the detectors 6 and 7. In this example, the sample injector 4 is configured to have the sample vaporization chamber formed therein; however, in a case where a gas sample is introduced into the sample injector 4, for example, as in a case where a sample is introduced into the sample injector 4 from a head space sampler, it is possible to use a sample injector 4 having no sample vaporization chamber formed therein.

Then, in each of the first detector 6 and the second detectors 7, individual sample components contained in the carrier gas introduced from the column 2 are serially detected. In addition, on the basis of detection results in the first detector 6 and the second detectors 7, a chromatogram is generated. The generated chromatogram is displayed on a display unit 22 (to be described later). Then, a user performs various analyses while recognizing the chromatogram.

2. Specific Configuration of Control Unit and Peripheral Components

Figure 2:
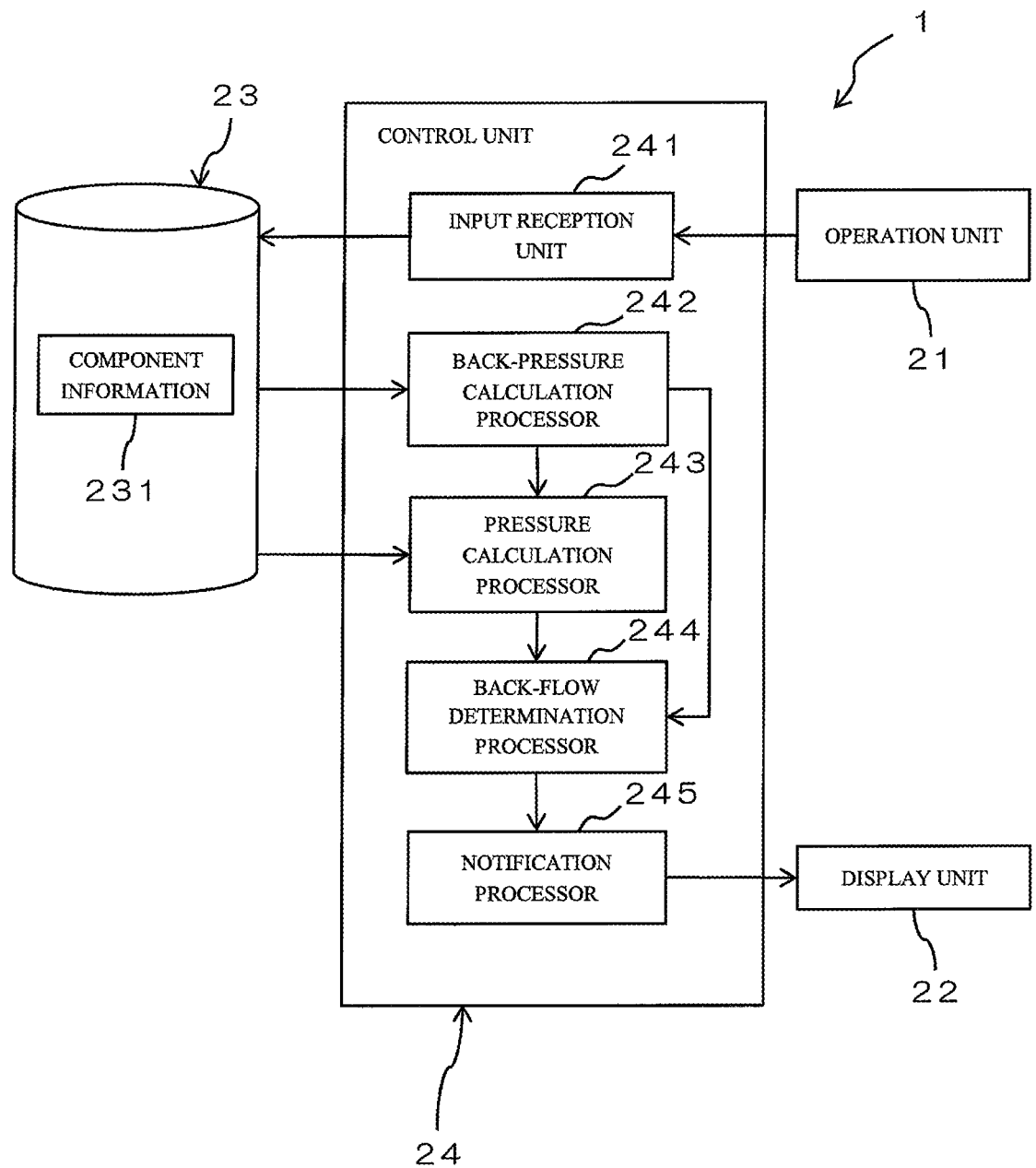
FIG. 2 is a block diagram showing a specific configuration of a control unit of the gas chromatograph of FIG. 1 and peripheral components of the control unit.

FIG. 2 is a block diagram showing a specific configuration of a control unit 24 of the gas chromatograph 1 of FIG. 1 and peripheral components of the control unit.

The gas chromatograph 1 includes an operation unit 21, the display unit 22, a storage unit 23, and the control unit 24.

The operation unit 21 is configured to include a keyboard and a mouse, for example. The user can perform an input work and the like by operating the operation unit 21.

The display unit 22 is configured with a liquid crystal display or the like.

The storage unit 23 is configured with, for example, an ROM (Read Only Memory) and an RAM (Random Access Memory). The storage unit 23 stores component information 231.

The component information 231 will be described later in detail and is detailed information, on each component of the gas chromatograph 1, to be input by the user operating the operation unit 21.

The control unit 24 is configured to include, for example, a CPU (Central Processing Unit). To the control unit 24, the operation unit 21, the display unit 22, the storage unit 23, and the like are electrically connected. By the CPU executing a program, the control unit 24 functions as an input reception unit 241, a back-pressure calculation processor 242, a pressure calculation processor 243, a back-flow determination processor 244, a notification processor 245, and the like.

The input reception unit 241 receives an input of the component information 231 on the basis of the operation of the operation unit 21 by the user. The component information 231 received by the input reception unit 241 is stored in the storage unit 23.

The back-pressure calculation processor 242 calculates a back pressure to be applied to the first detector 6 on the basis of the component information 231 stored in the storage unit 23.

The pressure calculation processor 243 calculates a pressure of the carrier gas in the branching part 5 on the basis of the component information 231 stored in the storage unit 23 and the back pressure for the first detector 6 calculated by the back-pressure calculation processor 242.

The back-flow determination processor 244 determines whether a back-flow of the carrier gas will occur, on the basis of the pressure of the carrier gas in the branching part 5 calculated by the pressure calculation processor 243, and the back pressure for the first detector 6 calculated by the back-pressure calculation processor 242. Specifically, the back-flow determination processor 244 determines whether the carrier gas will flow back from the first detector 6 to the branching part 5 side, by comparing the pressure of the carrier gas in the branching part 5 calculated by the pressure calculation processor 243 with the back pressure for the first detector 6 calculated by the back-pressure calculation processor 242.

The notification processor 245 performs a process for causing the display unit 22 to display "error", on the basis of the determination result by the back-flow determination processor 244. Specifically, when the back-flow determination processor 244 has determined that a back-flow of the carrier gas will occur, the notification processor 245 notifies that the carrier gas will flow back.

3. Control Operation by Control Unit

Figure 3:
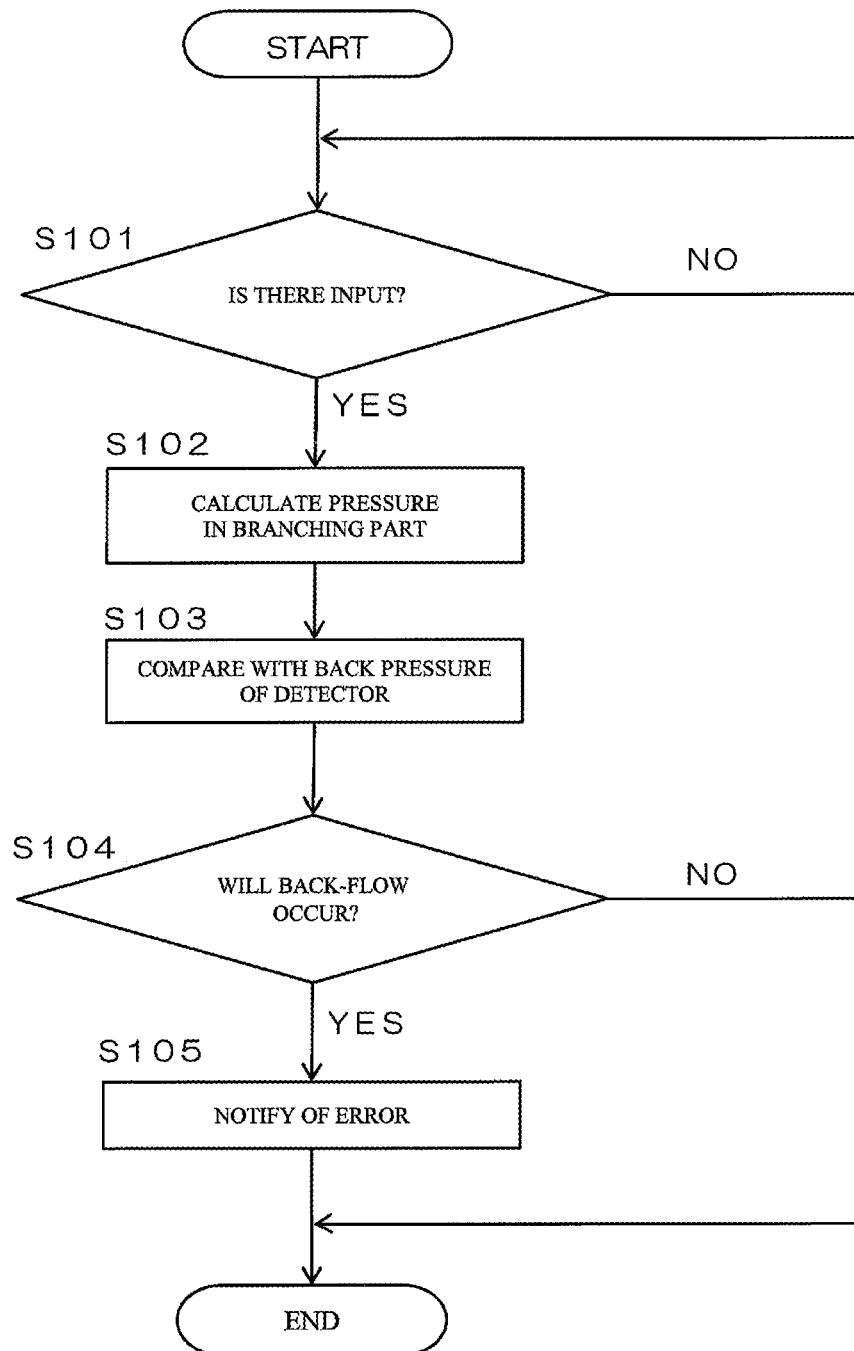
FIG. 3 is a flowchart showing an example of a control operation of the control unit.

FIG. 3 is a flowchart showing an example of a control operation of the control unit 24.

When an analysis is performed on the gas chromatograph 1, a user inputs the information about the components of the gas chromatograph 1 by operating the operation unit 21 (see FIG. 2) before starting an analysis operation.

Specifically, the user operates the operation unit 21 to display a setting screen (not shown) on the display unit 22. Then, the user operates the operation unit 21 to input the information about each of the components on the basis of the setting screen. In this example, the information to be input by the user includes a pressure of the sample injector 4, a flow rate of a detector gas to be introduced into the first detector 6, a temperature, an inner diameter, and a length of the column 2, a temperature, an inner diameter, and a length of the first introduction pipe 11, temperatures, inner diameters, and lengths of the second introduction pipes 12, and information on the types of the detectors (the first detector 6 and the second detector 7). Note that the information of the types of the first detector 6 and the second detector 7 is, for example, the information indicating whether the detector is a type of detector to which a back pressure is applied or is a type of detector which is open to the atmosphere.

When the user inputs the above-described information, the input reception unit 241 receives the input (step S101: YES). Then, the input reception unit 241 stores the received information in the storage unit 23 as the component information 231.

Then, the back-pressure calculation processor 242 calculates the back pressure ($P_n$) for the first detector 6 on the basis of the component information 231 stored in the storage unit 23. Specifically, the back-pressure calculation processor 242 identifies the first detector 6, which is a type of detector to which a back pressure is applied, on the basis of the information of the detectors stored in the component information 231. Further, the back-pressure calculation processor 242 calculates the back pressure for the first detector 6 on the basis of the flow rate of the detector gas to be introduced into the identified first detector 6.

Further, the pressure calculation processor 243 calculates a pressure of the carrier gas in the branching part 5 on the basis of the back pressure for the first detector 6 calculated by the back-pressure calculation processor 242 and the component information 231 stored in the storage unit 23 (step S102).

Specifically, the pressure calculation processor 243 calculates the pressure ($P_x$) of the carrier gas in the branching part 5 on the basis of the following equations (1) and (2).

[Mathematical Expression 1]

$$P_x = \sqrt{\frac{\sum_{n=0}^{N} \frac{P_n^2}{R_n}}{\sum_{n=0}^{N} \frac{1}{R_n}}} \quad (1)$$

[Mathematical Expression 2]

$$R_n = \frac{T_n L_n}{D_n^4} \quad (2)$$

In the above equation (1), $P^0$ represents the pressure of the sample injector 4, and $P_n$ (n >1) represents the back pressure for each detector. In addition, Ro represents a resistance value of the column 2, and $R_n$ (n >1) represents the resistance value of each of the introduction pipes (the first introduction pipe 11 and the second introduction pipes 12) connecting the detectors to the branching part 5. Note that when the value of the pressure for the second detector 7 is used as $P_n$, the value of the atmospheric pressure is used.

Further, in the above equation (2), $T_0$ represents the temperature of the column 2, $L_0$ represents the length of the column 2, and $D_0$ represents the inner diameter of the column 2. Further, in the above equation (2), $T_n$ (n≥1) represents the temperature of each of the introduction pipes (the first introduction pipe 11 and the second introduction pipes 12), $L_n$ (n≥1) represents the length of each of the introduction pipes (the first introduction pipe 11 and the second introduction pipes 12), and $D_n$ (n≥1) represents the inner diameter of each of the introduction pipes (the first introduction pipe 11 and the second introduction pipes 12). In a case where the introduction pipes are housed in the same column oven 3 as the column 2 as described in the present embodiment, an equation $T_n = T_0$ holds. In this case, $P_x$ can be calculated without using $T_0$ or $T_n$.

These values are the information stored in the storage unit 23 as the component information 231. The pressure calculation processor 243 reads the information on these values from the storage unit 23 and to calculate the pressure ($P_x$) of the carrier gas in the branching part 5 by using the values for the above equations (1) and (2).

Then, the back-flow determination processor 244 determines whether the carrier gas will flow back from the first detector 6 to the branching part 5 side, by comparing the pressure of the carrier gas in the branching part 5 calculated by the pressure calculation processor 243 with the back pressure for the first detector 6 calculated by the back-pressure calculation processor 242.

Specifically, when $P_x$, which is the pressure of the carrier gas in the branching part 5 calculated by the pressure calculation processor 243, is smaller than $P_n$, which represents the back pressure of the first detector 6, the back-flow determination processor 244 determines that the carrier gas will flow back, and when $P_x$, which is the pressure of the carrier gas in the branching part 5 calculated by the pressure calculation processor 243, is higher than or equal to $P_n$, which represents the back pressure of the first detector 6, the back-flow determination processor 244 determines that the carrier gas will not flow back.

If the back-flow determination processor 244 has determined that the carrier gas will flow back (step S104: YES), the notification processor 245 notifies that the back-flow of the carrier gas will occur, by causing the display unit 22 to display "error" (step S105).

Then, after recognizing the "error" on the display unit 22, the user takes a measure, for example, by updating the setting values for the components having been input with new setting values or changing (replaces) the components themselves and then newly inputting the information on the components after changing so that the determination result of the back-flow determination processor 244 becomes to indicate that no back-flow of the carrier gas will occur (step S104: NO).

By this measure, the carrier gas can be appropriately introduced into each of the first detector 6 and the second detectors 7 without causing the carrier gas to flow back.

Note that the control operation from the above-described step S102 to step S105 may be continuously performed after an analysis starts on the gas chromatograph 1. In this case, a control for stopping the analysis operation may be performed after step S105 by, for example, forcibly stopping the carrier gas.

4. Action and Effect (1) In the present embodiment, the back-flow determination processor 244 determines whether the carrier gas will flow back from the first detector 6 to the branching part 5 side, by comparing the pressure of the carrier gas in the branching part 5 calculated by the pressure calculation processor 243 with the back pressure for the first detector 6 calculated by the back-pressure calculation processor 242. Specifically, when $P_x$, which is the pressure of the carrier gas in the branching part 5 calculated by the pressure calculation processor 243, is smaller than $P_n$, which represents the back pressure of the first detector 6, the back-flow determination processor 244 determines that the carrier gas will flow back, and when $P_x$, which is the pressure of the carrier gas in the branching part 5 calculated by the pressure calculation processor 243, is higher than or equal to $P_n$, which represents the back pressure of the first detector 6, the back-flow determination processor 244 determines that the carrier gas will not flow back.

It is therefore possible to surely know that there is a possibility that a back-flow of the carrier gas will occur, by checking the determination result of the back-flow determination processor 244.

As a result, in the case where there is a possibility that a back-flow of the carrier gas will occur, it is possible to cause the carrier gas to appropriately flow into each detector without causing the carrier gas to flow back, by taking the following measures so that the determination result of the back-flow determination processor 244 indicates that no back-flow of the carrier gas will occur. Changing the setting values for the components having been input with new setting values (for example, changing the pressure of the sample injector 4); or changing the components themselves (for example, replacing the column 2, the first introduction pipe 11, or the second introduction pipes 12 with a new component) and newly inputting the information on the components after changing.

In this way, according to the gas chromatograph 1, it is possible to cause the carrier gas to flow into each of the first detector 6 and the second detectors 7 without providing a pressure controller.

(2) In addition, in the present embodiment, if the back-flow determination processor 244 has determined that the carrier gas will flow back (step S104: YES), the notification processor 245 notifies that a back-flow of the carrier gas will occur, by causing the display unit 22 to display "error" (step S105).

Thus, the notification of the error from the notification processor 245 enables the user to surely recognize that there is a possibility that the carrier gas will flow back.

(3) Further, in the present embodiment, the pressure calculation processor 243 calculates the pressure ($P_x$) of the carrier gas in the branching part 5 on the basis of the pressure of the sample injector 4 ($P_0$), the pressure for each of the first detector 6 and the second detectors 7 ($P_0$ (n >1)) the inner diameters of the column 2, the first introduction pipe 11 and the second introduction pipes 12, and the lengths of the column 2, the first introduction pipe 11, and the second introduction pipes 12.

It is therefore possible for the pressure calculation processor 243 to accurately calculate the pressure of the carrier gas in the branching part 5.

5. Modified Examples

In the above embodiment, it is described that the first detector 6 or the second detector 7 is connected to the port 51 which is one of the ports 51 of the branching part 5 and is different from the port 51 into which the carrier gas is introduced from the column 2. However, a mass spectrometer may be connected to the port 51 of the branching part 5, as a detector.

It is also described that the control unit 24 is provided in the gas chromatograph 1 in the above embodiment. However, the control unit 24 may be provided on a data processing device such as a PC electrically connected to the gas chromatograph 1. Then, the data processing device may perform the above-described various processes.

It is also described that, in the above-described embodiment, when the back-flow determination processor 244 has determined, in the control operation of the control unit 24, that the carrier gas will flow back, the notification processor 245 notifies that the carrier gas will flow back. However, when the back-flow determination processor 244 has determined that the carrier gas will flow back, a control may be performed to automatically change the information on the components having been set to appropriate setting values, or a control may be performed to display appropriate setting values on the display unit 22.

It is also described that, in the above-described embodiment, the notification processor 245 notifies that a back-flow of the carrier gas will occur, by causing the display unit 22 to display "error". However, the notification processor 245 may use sound to notify that a back-flow of the carrier gas will occur.

It is also described that, in the above-described embodiment, the component information 231 is input (set) by the operation of a user on the operation unit 21. However, the component information 231 may be previously stored in the storage unit 23.

It is also described that, in the above-described embodiment, the gas chromatograph 1 is provided with only one detector (first detector 6) to which the back pressure is applied. However, the gas chromatograph 1 may be provided with two or more of such detectors (first detectors 6). Further, such a type of detector is not limited to a dielectric barrier discharge ionization detector (BID).

DESCRIPTION OF REFERENCE SIGNS

1 gas chromatograph
2 column
4 sample injector
5 branching part
6 first detector
7 second detector
11 first introduction pipe
12 second introduction pipe
24 control unit
51 port
243 pressure calculation processor
244 back-flow determination processor
245 notification processor

The invention claimed is:

1. A gas chromatograph comprising:
   a column into which a carrier gas is introduced together with a sample from a sample injector;
   a branching part which causes the carrier gas together with the sample having passed through the column to branch to a plurality of ports;
   a plurality of detectors including at least one detector to which a back pressure is applied, wherein each of the detectors is connected to each of the plurality of ports through each resistance pipe and detects a component in the sample separated by the column;
   a pressure calculation processor which calculates a pressure of the carrier gas in the branching part; and
   a back-flow determination processor which determines whether the carrier gas will flow back to a side of the branching part from the at least one detector, by comparing the pressure calculated by the pressure calculation processor with the back pressure of the at least one detector.

2. The gas chromatograph according to claim 1, further comprising a notification processor which notifies that the carrier gas will flow back when the back-flow determination processor has determined that the carrier gas will flow back from the at least one detector to the branching part side.

3. The gas chromatograph according to claim 1, wherein the pressure calculation processor calculates the pressure of the carrier gas in the branching part, based on a pressure of the sample injector, pressures in the plurality of detectors, inner diameters of the column and the resistance pipes, and lengths of the column and the resistance pipes.

* * * * *